Feb. 13, 1968   E. O. ANDERSON ET AL   3,368,669
STRIPING TAPE
Filed May 24, 1967
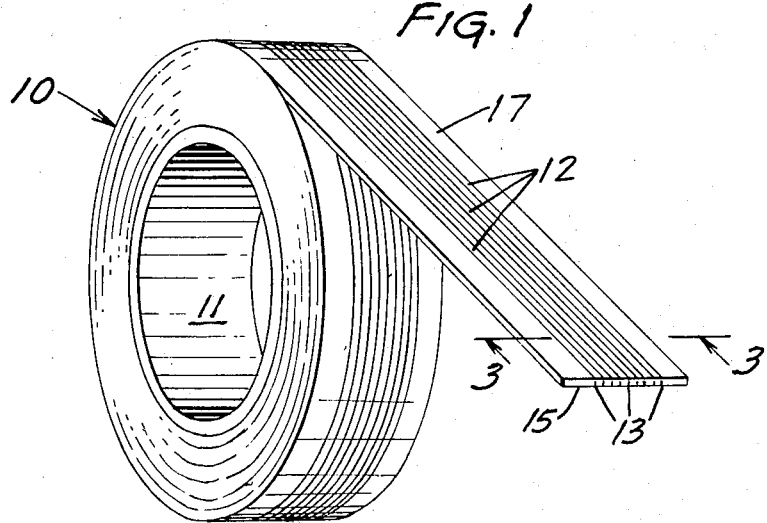
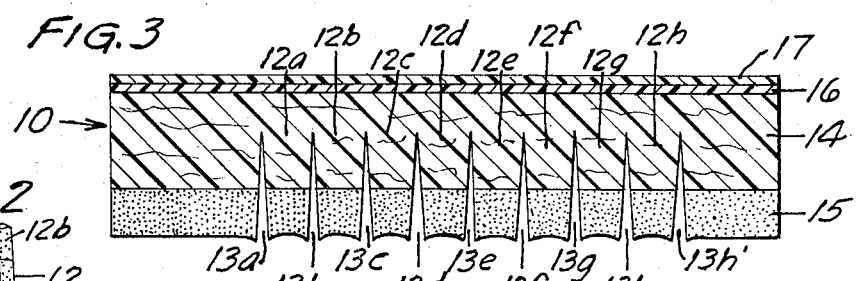
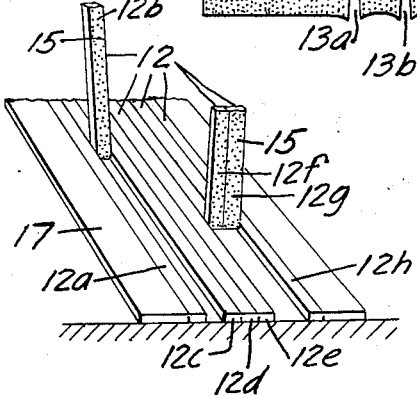
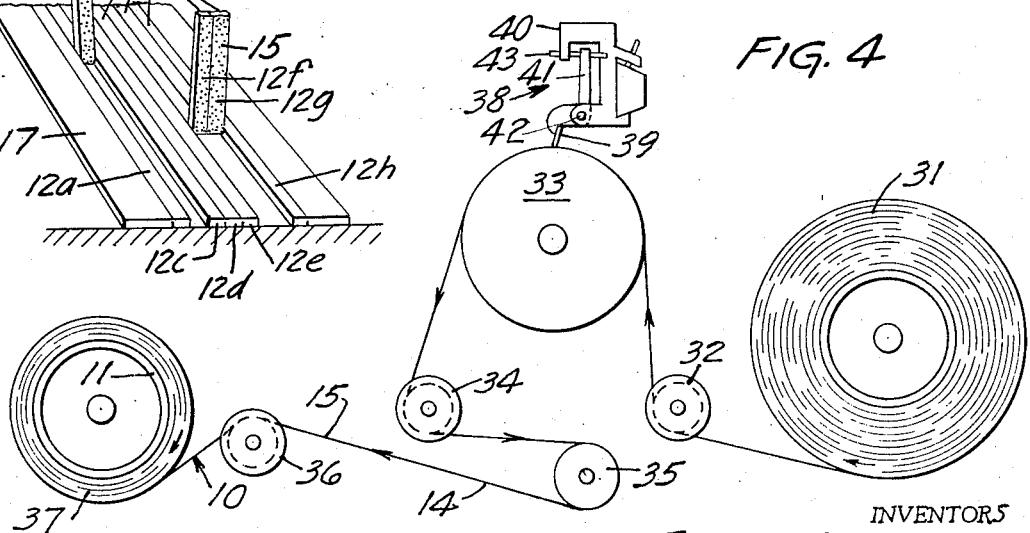
INVENTORS
ERNEST O. ANDERSON
WESLEY R. SWANSON
BY Carpenter, Kinney & Coulter
ATTORNEYS

United States Patent Office 3,368,669
Patented Feb. 13, 1968

3,368,669
STRIPING TAPE
Ernest O. Anderson, St. Paul, and Wesley R. Swanson, Maplewood, Minn., assignors to Minnesota Mining and Manufacturing Company, St. Paul, Minn., a corporation of Delaware
Filed May 24, 1967, Ser. No. 640,996
6 Claims. (Cl. 206—59)

ABSTRACT OF THE DISCLOSURE

A roll of masking tape is provided with a plurality of continuous slits which extend entirely through the adhesive layer but only partially through the backing. The tape can be unwound as a unit without lateral separation, applied to a substrate, and the tape between any two slits removed to expose the portion of the substrate which is to be painted.

Background of the invention

This invention relates to normally tacky and pressure-sensitive masking tape.

For several decades masking tape has been widely used to delineate an area which is to be painted from one which is to remain unpainted. Where a stripe is to be applied, one method of masking the surface involves separately adhering two strips of tape, spaced the appropriate distance apart to expose the desired width of substrate. Calabrese U.S. Patent 2,657,795 discloses a refinement of this technique, in which an odd number of separately slit strips of tape are wound on a common core in edge-to-edge relationship. The adjacent tacky adhesive layers cohere to some extent and tend to bind the strips of tape together. In theory, a roll of tape containing three contiguous strips can be unwound without lateral separation, applied to a substrate, and the center strip then removed. In practice, however, the strips tend to separate, particularly where the tape must be made to follow a lateral curve, resulting in stripes having uneven or irregular width. Masking tapes in common use today aggravate this problem, since pressure-sensitive adhesives tend to be firmer, and the layer applied thinner, than at the time of the Calabrese invention. If an attempt is made to slit only through the backing, leaving the adhesive layer substantially intact, the same difficulty is encountered in maintaining the integrity of the tape during unwinding and application. Furthermore, this technique tends to produce irregular edges of adhesive at the substrate, imparting similarly irregular edges to the stripe obtained.

Summary

The present invention provides normally tacky and pressure-sensitive adhesive striping tape which can be unwound as a unit without separation, applied to a substrate and the tape readily and cleanly removed in a strip from the area which is to be painted.

In accordance with the invention normally tacky and pressure-sensitive adhesive masking tape is slit from the adhesive side along a series of spaced continuous lines, the slits completely severing the layer of adhesive but incompletely cutting through the fibrous backing of the tape. Although the tape thus remains joined as an integral unit, its cross tensile strength is decreased to a minor fraction of the value prior to slitting. When this tape is applied to a substrate, the cleanly cut adhesive area sharply defines a line of demarcation between the masked and unmasked portions. The integrity of the tape is such that it can be distorted laterally to conform to curves or bends in the substrate without erratic separation of the stripe-defining portions of the tape.

Brief description of the drawing

The invention will be better understood by referring to the accompanying drawings, in which like numbers refer to like parts in the several views, and in which:

FIGURE 1 is a view in perspective of a roll of striping tape made in accordance with this invention;

FIGURE 2 illustrates the application of the tape of FIGURE 1 to a substrate, showing how strips of tape are removed to expose portions of the substrate to be striped;

FIGURE 3 is a greatly enlarged cross-sectional view of a portion o fthe tape shown in FIGURE 1, looking in the direction of the arrows 3—3; and FIGURE 4 is a sketch indicating the manner in which the roll of tape in FIGURE 1 is prepared.

Description of the preferred embodiment

In the drawings, striping tape 10 is wound convolutely upon itself about core 11. Tape 10 is in turn subdivided into individual tape strips 12 by slits 13 which extend from the adhesive surface of tape 10 partially through backing 14. Tape 10, as is particularly shown in FIGURE 2, is made up of resin saturated fibrous backing (typically kraft paper) provided at one face with a coating of a normally tacky and pressure-sensitive adhesive 15. Since the resin used to saturate the backing is typically thermoplastic and soluble in many organic solvents of the type which serve as carriers for paints, varnishes, and lacquers, the back surface of the treated paper backing 14 is provided with a backsize of thermosetting resin 16 which is substantially insoluble in such solvents. Over backsize layer 16 is applied an extremely thin layer of a low adhesion backsize material 17 to reduce the adhesion of pressure-sensitive adhesive layer 15 to the backing and thereby facilitate unwinding tape 10 from a roll.

In a presently preferred embodiment of the invention, backing 14 is a 30-lb. smooth crepe paper having an in situ-cured polyurethane saturant as described in Zenk and Lundquist U.S. Patent 3,248,254. Pressure-sensitive adhesive 15 is a rubber-resin of the type disclosed in Drew U.S. Patent 2,203,677, while backsize 16 is a butylated urea-formaldehyde resin, as disclosed in Kellgren U.S. Patent No. 2,548,980. Low adhesion backsize coating 17 is a octadecyl acrylate, as disclosed in Hendricks U.S. Patent No. 2,607,711. It is to be understood that the invention is not limited to the specific components or construction just named, and those having ordinary skill in the art will readily recognize equivalents.

The cross tensile strength of 30-lb. paper used in masking tape is typically in the range of 4–5 lbs. per inch before saturation and 10–15 lbs. per inch after saturation. Pressure-sensitive adhesive layer 15, backsize 16, and low adhesion backsize 17 appear to have little or no effect on the ultimate tensile strength. After slitting, the cross tensile strength of the tape described in the preceding paragraph is found to be in the range of 1–5 lbs. per inch, or about 10–50% its original value.

Although slits 13 do not penetrate entirely through backing 14, the lines created by such slits are typically visible from the back surface of tape 10, as is shown in FIGURES 1 and 2. There is some indication that when backsize 16 is comparatively brittle, even though thin, it is cracked during the slitting operation. The stiffening effect imparted by backsize 16 is believed to localize stresses and facilitate the clean tearing of backing 14 along slit lines 13 during removal of individual strips 12 after tape 10 has been applied to a substrate which is to be striped.

As is shown particularly in FIGURE 2, tape 10 is applied in the desired location on a substrate, after which individual strips 12 are loosened with the thumbnail and removed, exposing the areas of substrate which are to be painted. In the presently preferred embodiment of this invention, a 1-inch width of masking tape 10 is provided with nine slits, 13a–13i, spaced 1/16-inch from each other, thereby subdividing the tape into eight strips, 12a–12h, each 1/16-inch wide, and two strips 1/4-inch wide. It will be noted that when a 1-inch tape of this type is applied to a surface, removal of one of the strips 12a through 12h will expose a 1/16-inch wide area of the substrate. It will likewise be apparent that it is possible to obtain a wide variety of striping patterns from this tape, e.g., two 1/8-inch stripe separated by 1/4-inch, five 1/16-inch stripes separated by 1/16-inch, one 1/2-inch stripe, etc. FIGURE 2 shows how removal of strips 12b, 12f, and 12g provides for a 1/16-inch stripe and a 1/8-inch stripe, separated by 3/16-inch.

FIGURE 3 shows the presently preferred manner of preparing the tape of this invention. Tape 10 is unwound from stock roll 31, thereafter passing (adhesive side in) around guide roll 32 and (adhesive side out) around backup roll 33. Slitting assembly 38, positioned adjacent backup roll 33, comprises body 40 to which a plurality of arms 41 are connected through pivot 42. At the upper end of each arm 41 is an adjustment screw 43, which permits the rotation of arms 41 about pivot 42 to any predetermined position. At the opposite end of each arm 41 is mounted a tungsten carbide knife 39, the knives being spaced from each other at the desired distance. Adjustment screws 43 are moved to so position knives 39 that the penetrate adhesive layer 15 on tape 10, and partially penetrate backing layer 14. After the controlled depth slitting operation is completed, tape 10 passes around guide roll 34, 35, and 36, and is wound on core 11 to provide a roller of tape as shown in FIGURE 1.

What is claimed is as follows:

1. A roll of normally tacky and pressure-sensitive adhesive striping tape comprising in combination an elongate strip of pressure-sensitive adhesive tape wound convolutely upon itself about a core, said tape comprising
    an elongate nonwoven fibrous backing strip impregnated with a flexible unifying resinous treating material,
    a layer of normally tacky and pressure-sensitive adhesive firmly bonded to one face of the impregnated backing,
    a low adhesion backsize coated over the other face of impregnated backing,
    a plurality of continuous slits, extending longitudinally of said strip, said slits extending entirely through the layer of pressure-sensitive adhesive and partially through the impregnated backing, whereby the cross tensile of the slit portion of said tape between is reduced to a minor fraction of the cross tenslie of the unslit portion,
    whereby said tape can be unwound as a unit without separation, applied to a substrate, and the tape between two of said slits removed to expose the portion of said substrate to be striped.

2. The roll of tape of claim 1 wherein the cross tensile value for the slit portion of said tape is on the order of 1 to 5 lbs. per inch.

3. The roll of tape of claim 2 wherein the fibrous backing is paper.

4. The roll of tape of claim 3 wherein
    the unifying resinous material is thermoplastic and substantially soluble in organic solvents commonly employed in paints, lacquers, varnishes, and the like and
    interposed between the impregnated paper backing and the low adhesion backsize is a thin continuous coating of a thermosetting composition which is substantially insoluble in organic solvents commonly employed in paints, lacquers, and the like.

5. The roll of tape of claim 4 wherein the slits are parallel to each other and to the edges of the strip.

6. The roll of tape of claim 5 wherein there are nine slits spaced approximately 1/16-inch apart, so as to provide for either a single stripe from 1/16- to 1/2-inch wide or a plurality of parallel stripes of either the same or different widths.

References Cited
UNITED STATES PATENTS

| | | | |
|---|---|---|---|
| 2,657,795 | 11/1953 | Calabrese | 206—59 |
| 2,954,868 | 10/1960 | Swedish, et al. | 206—59 |
| 3,086,692 | 4/1963 | Cage | 229—51 |

WILLIAM T. DIXSON, JR., *Primary Examiner.*